Patented July 16, 1929.

1,721,315

UNITED STATES PATENT OFFICE.

EMIL E. NOVOTNY, OF LOGAN, AND CHARLES J. ROMIEUX, OF WEST PHILADELPHIA, PENNSYLVANIA, ASSIGNORS TO JOHN STOGDELL STOKES, OF HUNTINGDON VALLEY P. O., PENNSYLVANIA.

RESINOUS CONDENSATION PRODUCT OF PHENOL AND CELLULOSE.

No Drawing. Application filed September 6, 1924. Serial No. 736,277.

This invention relates to the manufacture of condensation products of phenol and cellulose, resulting in the production of products of a resinous nature. These products are formed without the addition of an acid or basic catalyst, and therefore the resulting resinous products are free from objectionable extraneous substances.

Where these condensation products are to be used for the purpose of molding in or between metal dies, extraneous free acids are injurious to such equipment and the finished product will be inferior because of higher moisture absorption and decreased dielectric strength. Where acid catalysts are used and a resin is formed into a heavy and viscous body, it is a very difficult matter to remove or neutralize such an extraneous substance without a considerable amount of effort and expense. It is practically impossible to determine precisely the quantity of such substances present because of the physical properties of the material and the fact that side reactions take place whereby the catalytic agents combine with or are destroyed by the reacting mass, resulting in various undesirable products. One of the undesirable products which may be obtained is the finely divided insoluble mass which may or may not be of a carbon nature, which is extremely difficult to remove. It is, of course, understood by those in the art that such infusible particles, such as, for example, carbon, are undesirable and will have a deleterious effect upon the dielectric properties of the final product.

The condensation products of phenols and cellulose are by our methods produced through the intermediary of a high temperature, preferably in an inclosed pressure resisting container. The temperature at which the condensation takes place is preferably between 400 to 500° F., at which temperature considerable pressure is built up within the container. The resulting product may be a liquid, semi-liquid, or solid, depending upon the temperature used and the length of time the reaction is permitted to continue. When these products are freed from excess phenol in any well known manner, such as by distillation, they are potentially reactive without the admixture of any other material, while, moreover, the products having a large quantity of excess phenol will be fusible; i. e., may be remelted repeatedly without becoming infusible.

These products are valuable for use in plastic molding and more particularly for use where a quick, thermo-setting, resinous product is desirable. They make excellent solutions with various organic solvents such as alcohol, acetone, ether, furfural, formaldehyde, caustic soda, and other basic materials, etc., and in this condition may be used as surfacing materials or may be impregnated into various fibrous materials such as paper, cloth, cellulose, wood flour, etc., or may be mixed with inorganic fillers and suitable pigments and colors.

The liquid or solid products may be mixed with or without the use of solvents, with suitable fillers, colors, lubricants or plasticizing agents in either liquid or solid form in order to produce molding materials or mixtures which may be shaped under heat or heat and pressure into various shapes and forms.

Although these products of themselves react to infusibility upon heating from one to ten hours at temperatures of from 250° to 500° F., the speed of the reaction may be greatly accelerated when they are in the presence of suitable hardening or accelerating agents. The most suitable are the aldehydes or materials capable of engendering aldehydes such as, for example, formaldehyde, furfural, hexamethylenetetramin, or combinations of formaldehyde and ammonia or other materials having active methylene groups in condition to combine, such as anhydroformaldehydeaniline. It might also be stated that acids, bases, neutral acid and alkaline salts have an accelerating action on these condensation products.

Various plasticity agents such as solid solvents or lubricants of a liquid or solid nature may be mixed therewith, such as, for example, camphor, paraffin, lanolin, or various oils such as tung and paraffin.

The proportion of reacting materials as before stated may be varied considerably inasmuch as free phenol may readily be removed, and therefore it is not essential that the specific amounts of materials given below in the illustrated example must be precisely followed. So that our invention may be better understood, the following procedure is shown by example:

A mixture of 100 pounds of wood flour and 400 pounds of commercial crystalline phenol are placed in a pressure resisting container which is heated to a temperature of 480° F. for a period varying from 2 to 20 hours, depending upon the type of product desired. The pressure is then gradually released, allowing any uncombined phenol to escape into a suitable condenser, and any further excess of phenol remaining in the product may be readily removed by applying heat to the container connected to a condenser. When the uncombined phenol has been removed, a hard, brownish black, lustrous, high melting resin is obtained. By heating for the longer period of time under pressure in a kettle the wood flour is entirely digested, whereas if the period of heating is shortened undigested wood flour remains which may serve as a filler, and the resulting product after the removal of excess phenol may be employed directly as a molding compound. This method results in considerable economy as it obviates the necessity of dissolving the resinous product in a suitable volatile solvent and impregnating the fibrous fillers therewith and evaporating therefrom the solvent, all these operations being eliminated and the final molding compound obtained in one operation.

To render the products very thermo reactive, they may be mixed or combined with formaldehyde solution or the dry polymers of formaldehyde. Where very high melting products are to be treated, they may previously be dissolved in suitable amounts of solvent such as alcohol. We find it preferable to actually combine these accelerating or hardening agents with the condensation products previous to their final reaction or use. Where it is desired to increase further the reactivity, small amounts of ammonia may be introduced together with the formaldehyde, but it will be found preferable not to substitute hexamethylenetetramin for the entire amount of active methylene body introduced as it is undesirable to obtain final products having a high nitrogen content. Other aldehydes such as furfural or acetaldehyde may be employed in place of the formaldehyde. Furfural may be employed both as a solvent and an accelerator. Thus we find it possible to dissolve the condensation products in small quantities of furfural or introduce merely small quantities of furfural therewith so as to obtain a plastic material which may be pressed either hot or cold and subsequently hardened by heating for a sufficient length of time. This makes the product very desirable for cold molding.

Wherein we employ the term phenol we wish to include phenol, its homologues and substituted phenols. Whererein we employ the term formaldehyde we wish to include its polymers or bodies capable of engendering formaldehyde or possessing active methylene groups. Wherein we employ the term cellulose we wish to include cellulose or its various derivatives or modifications and substances usually associated in natural materials with cellulose. For example, we wish to include cotton, paper, wood flour, lignin, cellulose xanthate, nitrate and acetate, or gelatinized cellulose products. Wherein we use the term furfural we wish it to include as well its homologues or substituted products.

What we claim is—

1. The herein described method of producing a resinous condensation product which comprises heating a mixture of but two ingredients, a phenolic body and cellulose, to a temperature above 250° F. to cause said two ingredients to react and condense to a soluble, fusible resinous mass.

2. The herein described method of producing a resinous condensation product which consists in heating a mixture of but two ingredients, phenol and cellulose to a temperature above 250° F. and at super-atmospheric pressure to cause the two ingredients to react and form a soluble, fusible resinous mass in situ with a portion of the cellulose material in an undigested condition.

3. The herein described method of producing a resinous condensation product which consists in heating a mixture of phenol and cellulose to a temperature above 250° F. and at super-atmospheric pressure to cause the two ingredients to react and condense to a soluble, fusible resinous mass without the use of any additional condensing agent, and adding thereto a hardening agent to cause the soluble, fusible mass to assume a substantially insoluble, infusible form when subsequently heated.

4. The herein described method of producing a resinous condensation product which consists in subjecting a mixture of phenol and cellulose to a temperature of from 250 to 500° F. to cause the two ingredients to react to a soluble, fusible resionous mass without the use of any additional catalytic agent.

5. The herein described method which consists in producing a resinous condensation product of a phenol and cellulose containing body by heating a mixture of these two ingredients, without the addition of catalytic agents, under super-atmospheric pressure at a temperature of from 250 to 500° F. to form a soluble, resinous fusible mass, and subsequently adding thereto a hardening agent to increase the reactivity of the mass.

6. The herein described method which consists in producing a condensation product of a phenol and a cellulose containing body by heating the same, without the addition of catalytic agents, under super-atmospheric pressure at a temperature of from 250 to 500° F. to form a soluble, fusible mass and subsequently adding an aldehyde hardening agent thereto to increase the reactivity of the mass.

Signed at Philadelphia, in the county of Philadelphia and State of Pennsylvania this 5th day of September, A. D. 1924.

EMIL E. NOVOTNY.
CHARLES J. ROMIEUX.